(12) United States Patent
Bae

(10) Patent No.: US 12,482,195 B2
(45) Date of Patent: Nov. 25, 2025

(54) METHOD FOR PROVIDING METAVERSE CONTENT

(71) Applicant: WHOBORN INC., Seoul (KR)

(72) Inventor: Young Sik Bae, Seoul (KR)

(73) Assignee: WHOBORN INC., Seoul (KR)

( * ) Notice: Subject to any disclaimer, the term of this patent is extended or adjusted under 35 U.S.C. 154(b) by 186 days.

(21) Appl. No.: 18/079,083

(22) Filed: Dec. 12, 2022

(65) Prior Publication Data

US 2023/0206570 A1    Jun. 29, 2023

(30) Foreign Application Priority Data

Dec. 24, 2021  (KR) .................. 10-2021-0187243
Dec. 24, 2021  (KR) .................. 10-2021-0187244
Sep. 5, 2022   (KR) .................. 10-2022-0112127
Oct. 17, 2022  (KR) .................. 10-2022-0133451

(51) Int. Cl.
*G06T 19/00* (2011.01)
*H04N 21/81* (2011.01)

(52) U.S. Cl.
CPC ....... *G06T 19/006* (2013.01); *H04N 21/8146* (2013.01)

(58) Field of Classification Search
CPC .................. G06T 19/006; H04N 21/8146
See application file for complete search history.

(56) References Cited

U.S. PATENT DOCUMENTS

| | | | |
|---|---|---|---|
| 7,720,733 B2 * | 5/2010 | Jung | G06Q 40/00 707/950 |
| 10,564,820 B1 * | 2/2020 | Cabanero | G06F 3/04815 |
| 2009/0241133 A1 * | 9/2009 | Lineberger | G06F 9/5011 719/328 |
| 2011/0055733 A1 * | 3/2011 | Hamilton | A63F 13/79 715/757 |
| 2014/0114845 A1 * | 4/2014 | Rogers | G06T 19/006 345/419 |

(Continued)

FOREIGN PATENT DOCUMENTS

JP    6840407 B1 *  3/2021

OTHER PUBLICATIONS

Imai Y. "Information Processing Apparatus, Information Processing System, and Information Processing Method" Mar. 10, 2021—JP-6840407-B1 English Machine Translation (Year: 2021).*

(Continued)

*Primary Examiner* — William A Beutel
*Assistant Examiner* — Chris Alejandro Puntier
(74) *Attorney, Agent, or Firm* — United One Law Group LLC; Kongsik Kim; Jhongwoo Peck

(57) ABSTRACT

A method for providing metaverse content having a data format including a plurality of blocks includes determining whether to provide the metaverse content according to an approval procedure for provision of the metaverse content defined in a first block among the plurality of blocks, upon receiving a request for providing the metaverse content from a user, transmitting the first block to the user in response to determining to provide the metaverse content, and transmitting remaining blocks other than the first block among the plurality of blocks to the user according to a communication protocol defined in the first block.

11 Claims, 4 Drawing Sheets

(56) References Cited

U.S. PATENT DOCUMENTS

2020/0184653 A1* 6/2020 Faulkner .................. G06T 7/40
2021/0398095 A1* 12/2021 Mallett .................. G06Q 50/01

OTHER PUBLICATIONS

Imai Y. "Information Processing Apparatus, Information Processing System, and Information Processing Method" Oct. 3, 2021—JP-6840407-B1 English Machine Translation (Year: 2021).*

Phung, Cao Vien, Jasenka Dizdarevic, and Admela Jukan. "Enhancing block-wise transfer with network coding in coap." European Conference on Parallel Processing. Cham: Springer International Publishing, 2019. (Year: 2019).*

* cited by examiner

METHOD FOR PROVIDING METAVERSE CONTENT

CROSS-REFERENCE TO RELATED APPLICATION

This application claims priority to Korean Patent Application No. 10-2022-0133451 filed on Oct. 17, 2022, Korean Patent Application No. 10-2022-0112127 filed on Sep. 5, 2022, Korean Patent Application No. 10-2021-0187244 filed on Dec. 24, 2021, and Korean Patent Application No. 10-2021-0187243 filed on Dec. 24, 2021. The aforementioned applications are incorporated herein by reference in their entireties.

RELATED ART

The present disclosure relates to a method for providing metaverse content.

The metaverse is a compound word of "meta", meaning virtual and transcendence, and "universe", meaning the world and cosmos, and refers to a virtual world where real life and legally recognized activities such as work, finance, and learning are connected in three dimensions (3D). That is, the metaverse is a concept that has evolved one step further than virtual reality (VR), and has the feature of being able to engage in social and cultural activities similar to those in real life, not just for enjoying games or virtual reality using avatars.

Acceleration Studies Foundation (ASF), a non-profit technology research group, classifies metaverse into four types: augmented reality, life logging, mirror worlds, and virtual worlds.

Augmented reality refers to an environment that interacts through virtual superimposed objects expressed in two dimensions (2D) or 3D in real space. Augmented reality has the characteristics of reducing people's rejection of the virtual world and increasing the sense of immersion. An example of augmented reality is a scene where a digitally constructed building of the past is displayed on a terminal of a user in a superimposed manner when the user takes a picture of the traces that currently remains only as ruins with a terminal camera.

Lifelogging is the art of capturing, storing, and depicting everyday experiences and information about objects and people. A user can capture every moment in his or her daily life as text, video, sound, or the like, store and organize the content on the server, and share the organized content with other users. An example of a daily life record is to store and share information such as running distance, calories burned, and music selection by linking sportswear with sensors to an MP3 player capable of connecting to a network.

The mirror world refers to a virtual world that reflects the real world as realistically as possible and as it is, but is expanded informationally. A typical example is Google Earth. Google Earth collects all satellite photographs from all over the world and updates the photographs at regular intervals, reflecting the ever-changing real world as it is. As technology continues to develop, the mirror world that reflects reality will become increasingly closer to the real world, which will become a major immersive element of virtual reality in the future. Users of the mirror world obtain information about the real world by viewing the virtual world.

The virtual world is one built by digital data for an alternative world similar to reality or completely different. In the virtual world, users perform activities similar to economic and social activities in the real world through avatars. The virtual world is the most familiar form of metaverse, and a concept that collectively refers to a community implemented in a 3D computer graphic environment from online role-playing games to living virtual worlds such as SANDBOX, ZEPETO, and Roblox.

Examples of the related art include Korean Patent Laid-Open Publication No. 10-2012-0110942 (Oct. 10, 2012).

SUMMARY

The present disclosure provides a method for providing metaverse content, capable of extending functions and granting freedom to improve content sharing efficiency in a metaverse environment, effectively protecting the uniqueness of content and the copyright of content creators when the content is shared, and eliminating the boundary between existential reality and virtual reality digitally through biological, human, and material insights to freely perform existential connection, virtual connection, replication and movement of digital twins by flexibly linking with devices of conventional content or existing physical objects, conceptual values, or the like.

However, the present disclosure is not limited thereto, and various modifications and changes can be made without departing from the spirit and scope of the present disclosure.

In accordance with an exemplary embodiment of the present disclosure, a method for providing metaverse content having a data format including a plurality of blocks may include determining whether to provide the metaverse content according to an approval procedure for provision of the metaverse content defined in a first block among the plurality of blocks in response to receiving a request for providing the metaverse content from a user terminal, transmitting the first block to the user terminal in response to determining to provide the metaverse content, and transmitting remaining blocks other than the first block among the plurality of blocks to the user terminal according to a communication protocol defined in the first block.

The transmitting of the first block to the user terminal may include bestowing uniqueness to the first block.

The bestowing uniqueness to the first block may include restricting at least one of an expiration date or a use right for the metaverse content.

The transmitting remaining blocks other than the first block among the plurality of blocks to the user terminal may include bestowing uniqueness to the remaining blocks.

The approval procedure for provision of the metaverse content may include at least one of determining to provide the metaverse content with no conditions considered, determining to provide the metaverse content after a separate verification procedure for the user, and determining to provide the metaverse content if one or more preset conditions are satisfied.

The first block may include at least one of the approval procedure for provision of the metaverse content, the communication protocol for transmitting the remaining blocks, information associated with the metaverse content, or a right for the user to access the remaining blocks.

The plurality of blocks may include a second block including information associated with an activity of an object in the metaverse, a third block including information associated with an object in the metaverse and a material of a surrounding environment of the object, a fourth block including information associated with an object in the metaverse and a design of a surrounding environment of the object, and a fifth block including information associated with an object in the metaverse and a status of a surrounding environment of the object.

The plurality of blocks may further include a sixth block including information associated with a version of the metaverse content and a seventh block that is a reserve block.

The information associated with the metaverse content may be abstract information that abstractly represents what the metaverse content is about, and may be used by a user that receives the metaverse content for reference in purchasing or selecting the metaverse content.

The user terminal receiving the metaverse content may infer information associated with a purpose or function of an object included in the metaverse content with reference to the abstract information associated with the metaverse content.

The metaverse content may be defined by information including a function of an object, and the user or artificial intelligence may determine various purposes thereof and use the object.

A plurality of metaverse content items, which includes metaverse content items corresponding to a plurality of objects, respectively, may be grouped into a plurality of grouped metaverse content items depending on a configuration of the metaverse, and the plurality of grouped metaverse content items may be transmitted from the content provider to the user terminal.

DETAILED DESCRIPTION

Figure 1:
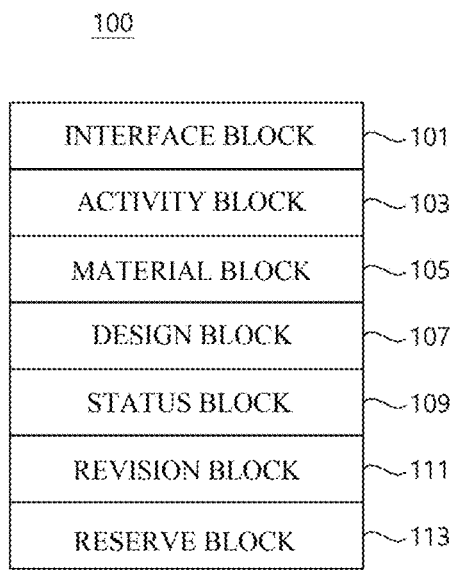
FIG. 1 shows metaverse content format in accordance with an exemplary embodiment of the present disclosure.

It is to be understood that the present disclosure may be variously modified and embodied, and thus exemplary embodiments thereof will be illustrated in the drawings and described in detail.

However, this is not intended to limit the present disclosure to the specific embodiments, it should be understood to include all modifications, equivalents, and substitutes included in the spirit and scope of the present invention.

Further, it will be understood that, although the terms first, second, etc. may be used herein to describe various elements, these elements should not be limited by these terms. These terms are only used to distinguish one element from another element. For example, without departing from the scope of the present disclosure, a first element could be termed a second element, and similarly, a second element could be termed a first element.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are no intervening element therebetween.

The terms used in the present application are merely provided to describe specific embodiments, and are not intended to limit the present disclosure. The singular forms, "a", "an", and "the" are intended to include the plural forms as well, unless the context clearly indicates otherwise. In the present application, it will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical or scientific terms, have the same meaning as commonly understood by those of ordinary skill in the art to which the embodiments of the present disclosure pertain. Terms, such as those defined in commonly used dictionaries, should be interpreted as having a meaning that is consistent with their meaning in the context of the related art and will not be interpreted in an idealized or overly formal sense unless expressly so defined herein.

Hereinafter, with reference to the accompanying drawings, exemplary embodiments of the present disclosure will be described in detail so that those of ordinary skill in the art to which the present disclosure pertains can easily practice the present disclosure.

Metaverse content may include data associated with objects in the metaverse and/or data associated with the surrounding environment constituting the metaverse. The metaverse content may include, for example, data associated with an object that a user may control in the metaverse and/or data associated with surrounding environments constituting the metaverse. The data associated with the object may include, for example, the shape, weight, color, temperature, voice (when the object is a human), sound, smell, taste, and the like, of the object. The data associated with the surrounding environments may include air, temperature, sound around the object, smell, taste, touch, and the like.

FIG. 1 shows metaverse content format in accordance with an exemplary embodiment of the present disclosure.

Referring to FIG. 1, metaverse content 100 in accordance with an exemplary embodiment of the present disclosure may include an interface block 101, an activity block 103, a material block 105, a design block 107, a status block 109, and a revision block 111. The metaverse content 100 may further include a reserve block 113.

The interface block 101 may include at least one of a set value for an approval procedure for the provision of the metaverse content, a communication protocol for transmitting the remaining blocks other than the interface block 101, information associated with the metaverse content, or a right for the user to access the remaining blocks.

The communication protocol for transmitting the remaining blocks may define, for example, a server method including a central server managed by a content provider, a P2P, or a serverless method. In more detail, in the case of the server method, P2P, or serverless method, the communication protocol for transmitting the remaining blocks may include a wired protocol such as Ethernet, the high-definition multimedia interface (HDMI), a display port (DP), a universal serial bus (USB), or the like, or a wireless communication protocol such as Bluetooth, WiFi, 4G, 5G, or 6G.

The approval procedure for provision of the metaverse content may include at least one of determining to provide the metaverse content with no conditions considered, determining to provide the metaverse content after a separate verification procedure for the user, or determining to provide the metaverse content when one or more preset conditions are satisfied.

The information associated with the metaverse content may be abstract information that abstractly represents what the corresponding metaverse content is about, and may be used by a receiving user who has received the metaverse content for reference in purchasing or selecting the metaverse content. For example, when abstract information associated with an object, 'vehicle', is transmitted, information abstracted from a visual point of view (e.g., form, shape, size, or the like) associated with the 'vehicle' and information abstracted from the point of view of the five senses (e.g., sound, touch, or the like) may be transmitted.

Here, when a real vehicle or a toy vehicle, or a living animal or a toy animal is purchased or selected, it may be difficult to distinguish from each other only by the appearance, and accordingly, in order to increase accuracy, the action and response may be checked by touching the abstract object, which makes it possible to confirm whether it is a living organism through touch.

Meanwhile, the receiving user who has received the metaverse content may infer information such as the purpose or function of the object included in the metaverse content by referring to the abstract information associated with the metaverse content, and in this case, may automatically read the purpose or function by utilizing a separate artificial intelligent technology. Here, the artificial intelligence may be installed on a user terminal of the receiving user that has received the metaverse content, outside the user terminal, or in a server/cloud. For example, artificial intelligence may determine the purpose of an object by using abstract information associated with the object included in the metaverse content and determine the usability of the actual content by trying its function. In this case, the artificial intelligence may be configured to determine the validity of the determined result. For example, by using abstract information from a visual point of view such as the shape and size and abstract information from a functional point of view such as the steering wheel and wheel regarding the object, 'vehicle', the receiving user or artificial intelligence may infer the purpose or function of the object and determine that the object is a 'vehicle'.

Meanwhile, not only users but also devices for reproducing metaverse content may use the information determined by artificial intelligence.

By providing abstract information associated with metaverse content and determining its purpose or function using artificial intelligence, the metaverse content may be shared without setting a separator or class for content, and content may be provided without classifying a specific object as a separator or class.

The activity block 103 may include information associated with the function of an object in the metaverse and information associated with an interface through which the metaverse reproduction device may communicate with the outside. Here, the information associated with the interface included in the activity block may be the same as or different from the communication protocol set in the above-described interface block 101.

The information associated with the function of the object in the metaverse may include for example, information that indicates that the object may be rotated clockwise or counterclockwise. The receiving user or artificial intelligence may determine and use the object as the steering wheel of the vehicle or the wheel of the vehicle based on the information associated with the function of the corresponding object. In other words, the metaverse content in accordance with an exemplary embodiment of the present disclosure may define only the function without defining the purpose of the object, so that the receiving user or artificial intelligence that receives the metaverse content may determine and use the corresponding object for various purposes. That is, the metaverse content may provide only basic information including the function of the object that is readable by the receiving party (that is, the user or the reproduction device for reproducing the metaverse content) to the receiving user or artificial intelligence, but the specific utilization or use method for the object may be entirely determined in a virtual environment accessed by the receiving user or artificial intelligence.

The information associated with the interface through which the metaverse reproduction device may communicate with the outside may be used to determine a communication (or network) interface for connection between the metaverse reproduction device and an external physical device or virtual device when the metaverse reproduction device is required to connect to the external physical or virtual device in reproducing the metaverse content.

The material block 105 may include information associated with an object in the metaverse and the material of a surrounding environment of the object. For example, the information associated with the material may include information associated with the material of the object, the properties of the material (physical information such as shape, color, or weight, and chemical information), or other information associated with the material (such as smell).

The design block 107 may include information associated with the design of the object in the metaverse and/or the surrounding environment of the object. For example, the information associated with the design may include the shape, size, space, and the like of the object. In addition, the information associated with the design may include the shape, size, and the like of a space surrounding the object. For example, when the space surrounding the object is a room, the information associated with the design may include the shape of the room and the size of the room.

The status block 109 may include information associated with the status of the object in the metaverse and the surrounding environment of the object. For example, the information associated with the status may include information such as the position of the object in the metaverse, and the temperature, humidity, wind direction, wind speed, gravity, magnetic field, illuminance, and smell of the surrounding environment of the object, and may also include information associated with time.

The revision block 111 may include information associated with the version of the metaverse content. For example, the information associated with the version may be provided in a form in which history management such as creation, modification, branching, duplication, transfer, correction, update, and citation is possible as in the concept of GIT, which is a version control system that supports distributed storage. The version update may be performed automatically, manually, or arbitrarily by the user at the time when the metaverse content is provided.

The reserve block 113 may include a method for transacting content, abstract information based on the five senses that is difficult to read realistically (e.g., sound generated from the object or the surrounding environment), a blockchain-based non-fungible token (NFT), information for general verification encryption or token, or the like. The method for transacting content may be handled by electronic contract regulations such as, for example, the smart contract form of Ethereum.

For example, in the case of converting a work of art into metaverse content, the work of art drawn by an artist on the canvas may be digitized by a precision scanning device. In this case, the metaverse content may be directly created by using a tool for metaverse content conversion. The precision scanning device may perform the scanning on the work of art by classifying it by size, shape, material, and characteristics, and material and color information may be included in the form of a 3D point cloud that includes the material and color information for each position of a part drawn with a brush through 5D scanning rather than simple 2D scanning. In this case, the characteristic element may be a physical object, and may not include details of separate communication or electrical and mechanical operation. However, with the physical object including the material information for each position and also including shape information, it is possible to predict the weight and other properties of each part, and also to create the metaverse content that is identical to the actual work of art. The scanned result may be stored in an appropriate block among the activity block 103, the material block 105, and the design block 107.

The created metaverse content may be wrapped to be protected by a non-fungible token (NFT) having a special uniqueness, or by encryption and uniqueness-guarantee technologies such as dedicated private blockchains, public blockchains, PKI, and compression algorithms.

Regarding the created metaverse content, an ownership thereof may serve as its uniqueness, and the ownership may be transferred based on a choice of an owner or rules set forth when the metaverse content is created, and a use right may be granted through token issuance.

For example, in the above-mentioned example of the work of art, the work of art may be set to prohibit copying, and instead, the work of art may be permitted to be viewed, rented, or exhibited by means of a token granted with the use right. That is, the metaverse content for the work of art is in a form of being viewed for exhibition purposes in a specific metaverse space, and tokens may be issued with the use right, which is set to prevent the specific metaverse space from being transferred to outside. A user who has viewed an exhibition in the metaverse may request a rental or transfer of the ownership interest of the work of art, and in this case, the rental may refer to receiving the use right so as to display a work of art in a desired location for a specified period of time, and the transfer of an ownership interest may be made according to the rules set forth at the time of creating the metaverse content. In the case of the transfer of an ownership interest, an assignee may also inherit a right to issue tokens for granting the use right. As described above, the metaverse content may be built without defining a purpose, and rather by only defining physical properties such as a function or material, design, and status of an object. Therefore, a method for utilizing the object may be determined by the selection of the user who has the ownership or the use right. For example, in the example of the work or art described above, the user may make a determination so as to utilize the work of art by displaying the work of art for other users to view it, but may make a determination to use it as a table or as a wooden timber for a doorway, or use it as a sled board for riding.

In order to set a plurality of use rights, a plurality of tokens may be set to be issued simultaneously at the time of creating the metaverse content. In this case, the total number of tokens, an expiration date, or both, may be limited, and thus the number of distributed use rights may be limited. In this way, the metaverse content may be distributed in various ways, but since the token issuance only grants the use right, the right of the owner is not diluted. Accordingly, safe utilization of the metaverse content may be made possible, allowing many people to use the metaverse content while protecting the ownership.

In the metaverse content in accordance with an exemplary embodiment of the present disclosure, content information based on physical, chemical, or conceptual information associated with an object, information associated with a function of the object, a method for transacting content, or the like, may be set in the interface block 101, the activity block 103, the material block 105, the design block 107, the status block 109, or the reserve block 113, which have been described above, in advance at the time of creating the metaverse content, thereby making it possible to utilize the uniqueness without limitation even if the receiving party does not perform a separate analysis.

Figure 2:
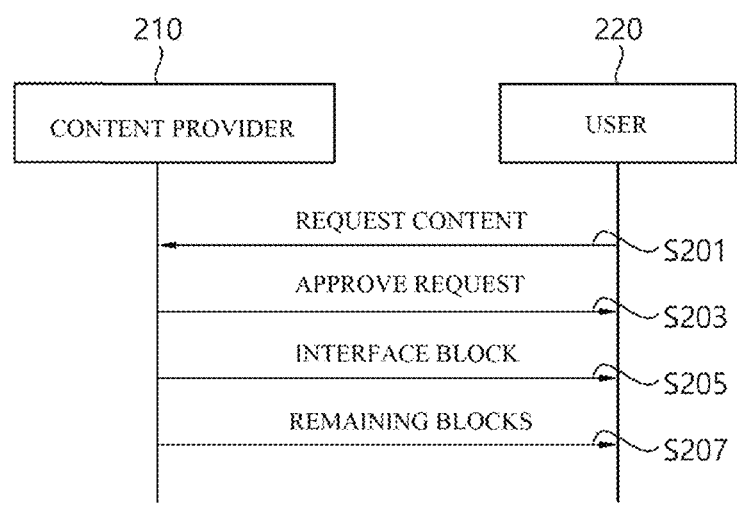
FIG. 2 shows a method for providing metaverse content in accordance with an exemplary embodiment of the present disclosure.

FIG. 2 shows a method for providing metaverse content in accordance with an exemplary embodiment of the present disclosure.

Referring to FIG. 2, when a user or a user terminal 220 requests metaverse content from a content provider 210 (S201), the content provider 210 may approve the request according to a content provision approval procedure (S203). Here, the content provider that provides the metaverse content may set and operate a set value of the approval procedure in the interface block 101 of the metaverse content in advance. Hereinafter, the user terminal 220 may be a reproduction device for reproducing the metaverse content.

The content provision approval procedure may be defined in the interface block 101 of the corresponding metaverse content format, and for example, may be defined to approve the request of the user unconditionally, after a separate confirmation procedure, or when one or more preset specified conditions are satisfied.

Here, the metaverse content may include a content item associated with an object that a user may control in the metaverse and a content item associated with surrounding environments constituting the metaverse. For example, in a metaverse application for driving practice, a content item associated with a vehicle (that is, an object) and a content item associated with a driving route (that is, a surrounding environment) may be included.

When the content request is approved, the content provider 210 may transmit the interface block 101 for the content to the user or the user terminal 220 (S205).

Figure 3:
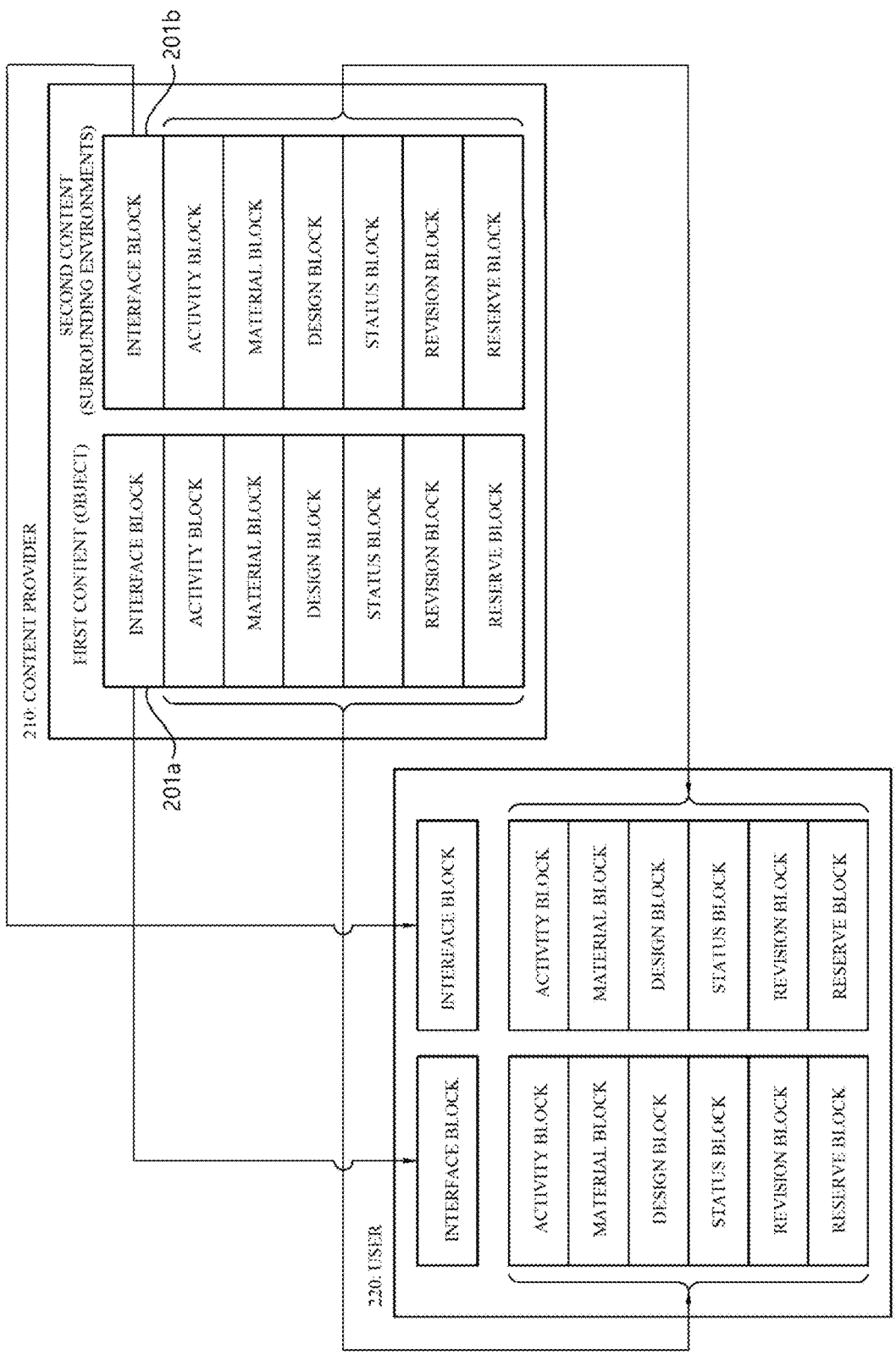
FIG. 3 shows a method for providing a plurality of metaverse content items in accordance with another exemplary embodiment of the present disclosure.

Depending on the configuration of the metaverse, metaverse content items for one or more objects may be grouped and transmitted, and in this case, the interface block 101 for each object may be transmitted (refer to FIG. 3). For example, in the case of a metaverse for driving practice, the interface blocks 101 for the first content item (e.g., an object such as a vehicle) and the second content item (e.g., a surrounding environment such as a driving route) constituting the metaverse may be grouped and transmitted to the user terminal 220 by being bundled as one content item.

The interface block 101 may be transmitted according to a predetermined separate communication protocol irrespective of the communication protocol specified in the interface block 101.

For example, when the content provider 210 is a company or organization that provides a specific metaverse service, the interface block 101 may be transmitted from a server operated by the company or organization to the user terminal 220 through a wired or wireless network, and when the content provider is an individual, the interface block 101 may be transmitted to the user terminal 220 through a wired or wireless network by a P2P method.

The interface block 101 may be transmitted in a manner that may bestow uniqueness. For example, by restricting the expiration date and/or the use right for the corresponding content through tokenization of the interface block 101, the content provider 210 may transmit the interface block 101 to the user. In this case, only the users who have been granted the use right may use the corresponding content. When there are a plurality of users, the content provider 210 may transmit the tokenized interface block 101 by setting a separate expiration date and/or a use right for each of the users.

When the interface block 101 is transmitted, the content provider 210 may transmit remaining blocks for the content according to a communication protocol specified in the interface block 101 (S207).

Meanwhile, apart from bestowing uniqueness to the interface block 101, the remaining blocks may also be transmitted in a manner that bestows uniqueness.

In FIG. 2, the method for providing one metaverse content item to the user terminal 220 from the content provider 210 is described.

Depending on the metaverse configuration, a plurality of metaverse content items—for example, an object (first metaverse content item) and the surrounding environment of the object (second metaverse content item)—may be provided to the user terminal 220.

FIG. 3 shows a method for providing a plurality of metaverse content items in accordance with another exemplary embodiment of the present disclosure.

The content provider 210 may first transmit, to the user terminal 220, interface blocks for an object (first content item) and the surrounding environment (second content item) of the object, and then transmit remaining blocks to the user terminal 220 according to the communication protocols defined in the interface blocks. For example, in the case of a metaverse for driving practice, the interface block 101 for each of the first content item (e.g., an object such as a vehicle) and the second content item (e.g., a surrounding environment such as a driving route) constituting the metaverse may be transmitted to the user terminal 220.

Specifically, the content provider 210 may first transmit an interface block 201a for the first content item (object) to the user terminal 220 and then transmit he remaining blocks for the corresponding object—activity block, material block, design block, status block, revision block, and/or reserve block—to the user terminal 220 according to a communication protocol defined in the interface block 201a.

Specifically, the content provider 210 may first transmit an interface block 201b for the second content item, which is the surrounding environment of the object, and then transmit remaining blocks for the corresponding surrounding environment—activity block, material block, design block, status block, revision block, and/or reserve block—to the user terminal 220 according to a communication protocol defined in the interface block 201b.

In another exemplary embodiment of the present disclosure, a plurality of metaverse content items—for example, a plurality of objects (a plurality of metaverse content items)—may be provided to the user terminal 220.

There may be a corresponding metaverse content format for each object required in the metaverse. For example, when a vehicle is implemented in the metaverse, the vehicle may be implemented with a group of objects that a user may directly contact, such as a steering wheel and a pedal, and objects that the user does not directly contact, such as a wiper and glass. In this case, the user or the user terminal 220 may receive metaverse content in which various objects are grouped to implement the vehicle, from the content provider 210.

In this case, metaverse content for objects grouped for vehicles may be provided, and as shown in FIG. 3, the content provider 210 may first transmit the interface block 101 for each object to the user terminal (220), and then transmit the remaining blocks for each object to the user terminal 220 according to the communication protocol defined in the interface block 101.

Figure 4:
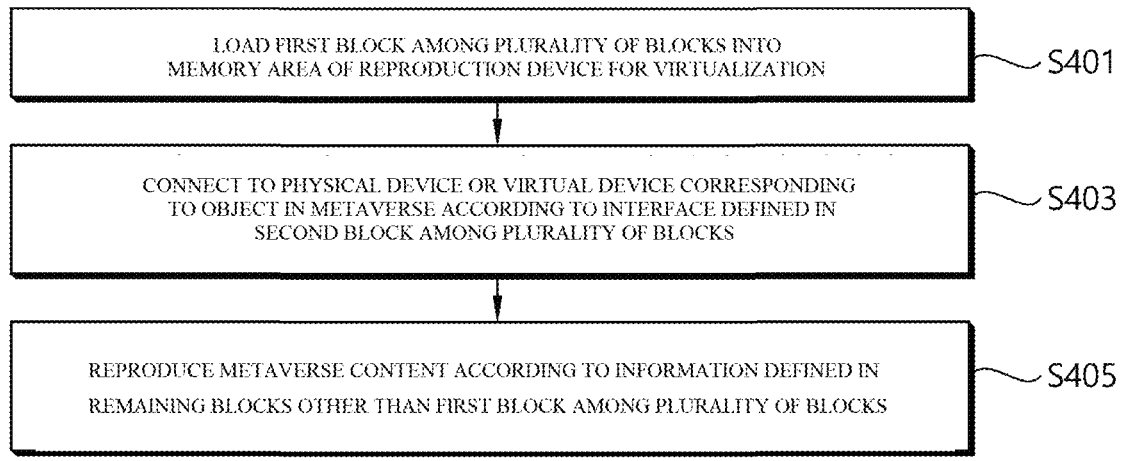
FIG. 4 is a flowchart of a method for reproducing metaverse content in accordance with an exemplary embodiment of the present disclosure.

FIG. 4 is a flowchart of a method for reproducing metaverse content in accordance with an exemplary embodiment of the present disclosure.

Referring to FIG. 4, the method for reproducing metaverse content according to an exemplary embodiment of the present disclosure may reproduce metaverse content having a data format including a plurality of blocks as shown in FIG. 1, which may be performed by, for example, a reproduction device such as a head mounted display (HMD).

In step S401, the reproduction device may load a first block among the plurality of blocks into a memory of the reproduction device for virtualization. Here, the first block may be the interface block.

In step S403, the reproduction device may connect to a physical device or a virtual device corresponding to an object in the metaverse based on an interface defined in a second block among the plurality of blocks. Here, the second block may be an activity block. When there is no need to connect to the physical device or the virtual device, step S403 may be omitted.

In step S405, the reproduction device may reproduce the metaverse content based on information defined in remaining blocks, other than the first block, among the plurality of blocks. Here, the remaining blocks may include at least one of an activity block, a material block, a design block, a status block, a revision block, or a reserve block.

The user may experience the metaverse according to the details defined in the metaverse content by using the reproduction device. In this case, the reproduction device may allow the user to remotely control an external physical device or virtual device in the metaverse by connecting to the physical device or virtual device based on information associated with the interface of the activity block, or to control an object only in the metaverse without connecting to the external physical device or virtual device. In the case of remotely controlling by connecting to the physical device or virtual device, the metaverse content for individual objects may exist separately, and thus individual objects may communicate with one another.

In the metaverse content format in accordance with an exemplary embodiment of the present disclosure, only the function of the object in the metaverse is defined without defining the purpose, and as a result, the user may use the object for various purposes according to the corresponding function.

In addition, the communication protocol such as interface information associated with the activity block may be defined together in the metaverse content, and as a result, there is no need for separate content driving software in the reproduction device.

The disclosed technology may have the following effects. However, it does not mean that a particular embodiment necessarily includes all of the following effects or only the following effects, and thus it is not to be construed that the scope of the disclosed technology is not limited thereby.

With the method for providing metaverse content in accordance with the exemplary embodiments of the present disclosure described above, the metaverse content provider may provide abstract information associated with metaverse content, thereby making it possible for the receiving user or artificial intelligence that receives the metaverse content to infer information such as the purpose or function of an object included in the metaverse content.

In addition, with the method for providing metaverse content in accordance with the exemplary embodiments of the present disclosure described above, the metaverse content may provide only basic information that is able to be read by a receiving party (that is, the user), thereby making it possible for the receiving user that receives the metaverse content to entirely determine a specific application or usage of the object in the virtual environment accessed by the user.

In addition, with the method for providing metaverse content in accordance with the exemplary embodiments of the present disclosure described above, the metaverse content provider may provide metaverse content having uniqueness for each user, thereby making it possible for the receiving user that receives the metaverse content to experience the metaverse by receiving information associated with the metaverse content and reproducing the metaverse content without any additional driving software.

Although the present disclosure has been described with reference to the drawings and exemplary embodiments, it will be understood that the present disclosure should not be limited to the drawings and exemplary embodiments, and various changes and modifications can be made by those of ordinary skilled in the art without departing from the spirit and scope of the present disclosure as hereinbelow claimed.

What is claimed is:

1. A method for providing metaverse content having a data format including a plurality of blocks from a content provider, the method comprising:
   in response to receiving a request for providing the metaverse content from a terminal of a user, determining whether to provide the metaverse content according to an approval procedure for provision of the metaverse content defined in a first block among the plurality of blocks;
   in response to determining to provide the metaverse content, transmitting the first block to the terminal, wherein the first block is an interface block, which includes a communication protocol that specifies a method for transmitting each of the remaining blocks other than the interface block; and
   transmitting remaining blocks other than the first block among the plurality of blocks to the terminal according to the communication protocol defined in the first block respectively for each of the remaining blocks,
   wherein the plurality of blocks comprise:
      a block including information associated with an activity of an object in metaverse;
      a block including information associated with an object in the metaverse and a material of a surrounding environment of the object;
      a block including information associated with an object in the metaverse and a design of a surrounding environment of the object; and
      a block including information associated with an object in the metaverse and a status of a surrounding environment of the object.

2. The method of claim 1, wherein the transmitting of the first block to the terminal comprises bestowing uniqueness to the first block.

3. The method of claim 2, wherein the bestowing uniqueness to the first block comprises restricting at least one of an expiration date or a use right for the metaverse content.

4. The method of claim 1, wherein the transmitting remaining blocks comprises bestowing uniqueness to the remaining blocks.

5. The method of claim 1, wherein the approval procedure for provision of the metaverse content comprises at least one of determining to provide the metaverse content with no conditions considered, determining to provide the metaverse content after a separate verification procedure for the user, or determining to provide the metaverse content if one or more preset conditions are satisfied.

6. The method of claim 1, wherein the first block further comprises at least one of the approval procedure for provision of the metaverse content, information associated with the metaverse content, or a right for the user to access the remaining blocks.

7. The method of claim 1, wherein the plurality of blocks further comprise:
   a block including information associated with a version of the metaverse content; and
   a block that is a reserve block.

8. The method of claim 1, wherein information associated with the metaverse content is abstract information that abstractly represents what the metaverse content is about, and is used by the user that receives the metaverse content for reference in purchasing or selecting the metaverse content.

9. The method of claim 1, wherein the terminal that receives the metaverse content infers information associated with a purpose or function of an object included in the metaverse content with reference to abstract information associated with the metaverse content.

10. The method of claim 1, wherein the metaverse content is defined by information including a function of an object, and the user or artificial intelligence determines various purposes thereof and use the object.

11. The method of claim 1, wherein a plurality of metaverse content items, which include metaverse content items corresponding to a plurality of objects, respectively, are grouped into a plurality of grouped metaverse content items depending on a configuration of metaverse, and
   wherein the plurality of grouped metaverse content items are transmitted from the content provider to the terminal.

* * * * *